United States Patent Office 3,511,211
Patented May 12, 1970

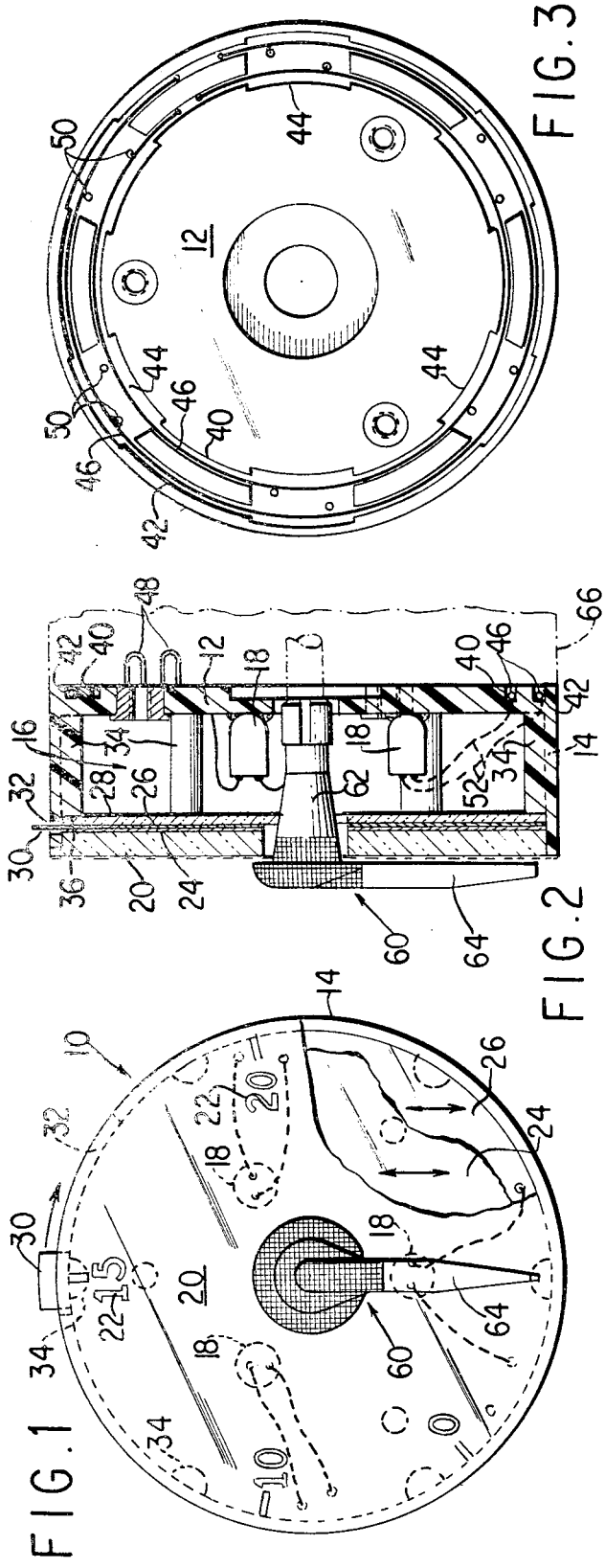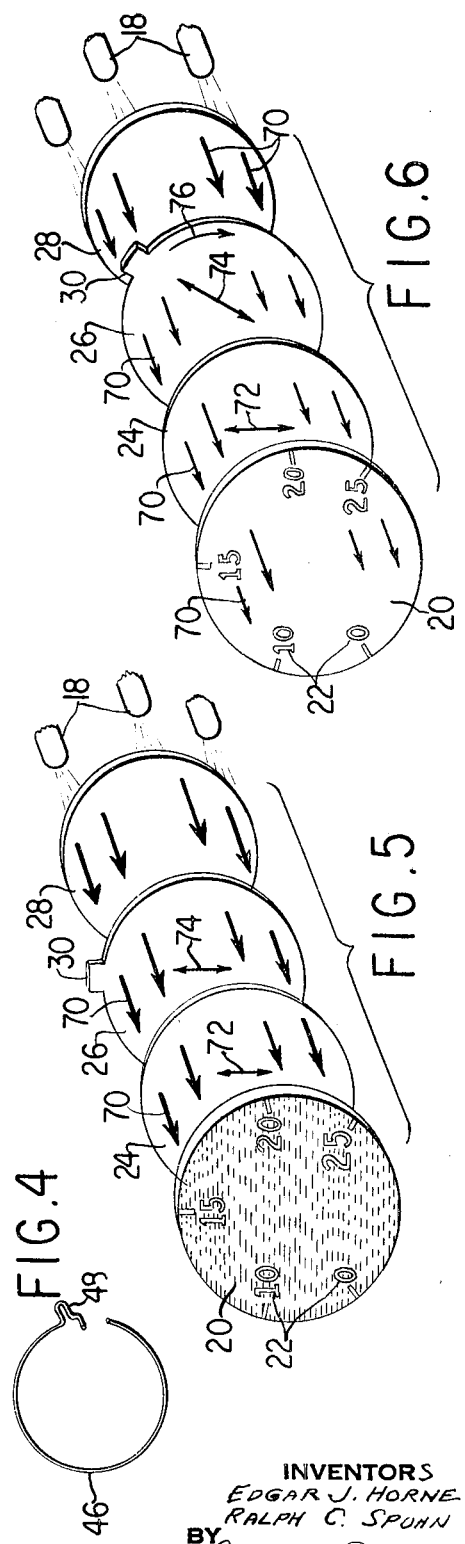

3,511,211
POLARIZED GAUGE DIAL
Edgar J. Horne, Perkasie, and Ralph C. Spohn, Greenlane, Pa., assignors to Ametek Inc., New York, N.Y., a corporation of Delaware
Filed July 21, 1967, Ser. No. 655,159
Int. Cl. G02b 5/30; G01d 13/02
U.S. Cl. 116—129                    1 Claim

ABSTRACT OF THE DISCLOSURE

An instrument panel dial for gauges and the like in which the intensity of illumination of indicia on the dial is controlled by relative rotation of polarized discs adapted to be locked in an angular position providing the desired intensity or a desired intensity ratio of brightness of pointer to indicia.

---

This invention relates to dials for gauges or the like and more particularly to dials in which the pointer and indicia are illuminated.

In the instrument and gauge art, it is old to provide a dial in which both the pointer and the indicating indicia are illuminated by a light source behind or adjacent to the dial members. Such dials find particular usage in the instrument panels of airplanes, automobiles and other vehicles. In the prior art devices, however, the intensity or brightness of the illumination is usually controlled by varying the voltage applied to the light source, or by toning or shading the reflecting surfaces of the lamp chamber or various transmitting surfaces where a specified intensity is required such as in certain military and commercial aircraft. In either case, it is difficult to obtain or maintain a desired or specified intensity, or a specified intensity ratio between the illumination of the pointer and the illumination of the indicia.

An object of the present invention is to provide a dial having illuminated indicia in which having achieved a brightness balance, the intensity or brightness of the overall illumination can be readily varied over a wide range and accurately adjusted to a standard or specified intensity without the use of rheostats or other voltage control means and without the necessity for individual toning or shading any of the light transmitting parts.

A further object is the provision of an illuminated instrument or gauge dial in which the overall brightness can be readily inexpensively adjusted or varied and then set or locked at a desired or specified intensity.

A further object is to provide a dial having an illuminated pointer and illuminated indicia in which the indicia to pointer brightness ratio can be varied within wide limits.

Another object is the provision of an illuminated dial device of the above character which permits complete freedom in choice of the color of the illumination.

A further object is the provision of an illuminated instrument and gauge dial in which the intensity of illumination is varied by a plurality of light polarized discs mounted for relative rotation about a transverse axis.

In one aspect of the invention, a cylindrical housing having an open front provides a lamp chamber within which one or more illuminating lamps are mounted. The open front is closed by a dial member provided with a plurality of light transmitting indicia adapted to be illuminated by the lamps. Interposed between the dial member and the lamps are at least two linear polarized discs mounted for relative rotation about a transverse axis whereby upon rotation of at least one of said discs the polarization or light transmitting axes may be angularly moved or crossed with respect to each other thereby to control the intensity of light passing through the discs. A means extending exteriorly of the housing provides for manually rotating at least one of the discs.

In a second aspect, a light diffuser member is mounted in the housing or lamp chamber between the dial and the lamps, preferably between the polarized discs and the lamps.

In a third aspect, one of a pair of polarized discs is mounted for non-rotation in the lamp housing and the other is mounted for rotation within the housing by a finger or tab extending exteriorly of the housing to vary the intensity of light passing through the discs, and the tab is then locked in an adjusted position giving a desired degree of intensity by a small dab of cement or the like.

In another aspect, the housing provides for a centrally mounted pointer constructed from "Plexiglas" or the like, trademark of Rohm & Haas for its acrylic plaster, and adapted to be illuminated by light from the lamp source in the lamp chamber.

The above and other objects, features and advantages of the invention will be apparent from the following description taken in conjunction with the accompanying drawing which illustrates an exemplary embodiment of the invention.

In the drawing:

FIG. 1 is a front elevational view, partly broken away, of a dial device embodying the present invention;

FIG. 2 is a vertical central sectional view of the dial structure;

FIG. 3 is a rear elevational view of the dial mechanism.

FIG. 4 is a perspective view of one of the electrically conducting connector rings for the illuminating lamps.

FIG. 5 is a schematic exploded perspective view of the dial, polarized disc and diffuser means; and FIG. 6 is a similar view illustrating one of the disc members rotated to a different angular position.

Referring to the drawing, and more particularly to FIG. 2, there is shown a hollow cylindrical casing or housing 10 having a rear wall 12 and a side wall 14 providing a lamp chamber 16 adapted to contain one or more illuminating lamps 18. In the illustrated embodiment, three lamps 18 spaced equi-distant around the axis of housing 10 are shown, but provision is made for accommodating at least six lamps as will be hereinafter described, it being understood that the number of lamps depends upon the degree of maximum illumination desired.

Non-rotatably mounted in the open front side of housing 10 is a dial member 20, best shown in FIG. 2, which may be made from glass or other suitable light transmitting material. The entire front face of dial 20 is rendered opaque to the transmission of light by suitable paint except for the indicia 22 which is left clear for illumination by lamps 18. Positioned inwardly of the dial member 20 and interposed between the dial and the lamps 18, are a pair of linearly polarized disc members 24 and 26. Disposed inwardly of the polarized discs 24 and 26 is a diffuser member or element 28 which may be made from "Plexiglas" or other light diffusing material. The disc 26 is rotatably mounted in the housing 10 and is provided with a radially projecting finger or tab 30 which extends outwardly of the housing through an elongated slot 32 provided in the wall 14. The slot 32 has an arcuate length such that the finger or tab 30 and disc 26 can be moved or rotated through angle of at least ninety degrees. The polarized discs 24 and 26 may comprise, for example, thin discs of linearly polarized material such as the material sold under the trademark "Polaroid," a trademark of the Polaroid Co. Suitable interlocking means between the disc 24 and wall 14 of housing 10 prevents rotation of disc 24 within the housing 10 whereby the discs 24 and 26 are mounted for relative rotation with respect to each other upon rotation of disc 26. In a similar manner, the diffuser member 28 may be mounted for non-rotation. The wall 14 of housing 10 is provided with a plurality, six in the illustrated embodiment, of inwardly projecting ribs 34 which stop short of the open end of the housing and provide seats 36 which support the diffuser member 28 with the discs 24 and 26 sandwiched between the dial 20 and diffuser 28.

As shown in FIGS. 2 and 3, the rear wall 12 of housing 10 is provided with a pair of concentric circumferential grooves or slots 40 and 42 which feed into six enlarged recesses 44 equally spaced around the axis of the housing. The slots 40 and 42 are adapted to receive a pair of electrically conducting connector rings 46 having the configuration shown in FIG. 4. The rings 46 have a hook-like portion 48 which extends rearwardly of the wall 12 and provide terminals for the lamps 18. As shown in FIGS. 1 and 3, each of the recesses 44 is provided with a pair of openings 50 extending into the lamp chamber 16. Lead wires 52 for the lamps 18 are adapted to pass through these openings for soldering or fastening a connection with the conductor rings 46.

Centrally mounted on the housing 10 is an indicating arm or pointer 60. The arm 60 and its shank portion 62 are constructed from "Plexiglas" or similar material adapted to conduct light rays and become illuminated by the lamps 18. Portions of the arm 60 and shank 62 are coated with a layer of white paint covered by an overlying layer of black paint, as indicated by the shading in FIGS. 1 and 2, to render these portions opaque. Thus, only the clear finger portion 64 becomes illuminated by the lamps 18. The housing 10 may be separately mounted on an instrument panel or the like or may be attached to the housing of an instrument as indicated by the dashed lines 66 of FIG. 2.

The operation of device is best illustrated by FIGS. 5 and 6. In these figures, arrows 70 indicate the direction of light propagation from the lamps 18 through the diffuser 28, the discs 26 and 24 and the indicia on dial member 20, whereas the arrows 72 and 74 indicate the direction or axis of the polarized light passing through the discs 24 and 26 respectively, i.e. the axes of polarization. With the operating finger 30 of disc 26 in the position shown in FIGS. 1 and 5, it will be noted that the polarization axes 72 and 74 of discs 24 and 26 are in the same direction or parallel, i.e. the angular relationship between the axes 72 and 74 is zero. With the discs 24 and 26 in this angular relationship, maximum light passes through the discs onto the indicia 22. As the finger 30 is manually moved in the direction of arrows 76 the disc 26 rotates and its polarization axis 74 moves angularly away from the axis 72 as illustrated in FIG. 6 thereby decreasing the light passing through the discs until there is minimum light at a relative angle of 90 degrees. The finger 30 can thus be moved to any desired intermediate position to give any desired intensity or brightness for the illumination of the indicia 22, or to provide a desired ratio of brightness between the pointer and the indicia. The finger or tab 30 and the disc 26 may then be locked in this relative angular position by applying a small dab of suitable cement or adhesive, such as RTV #892 adhesive, between the tab 30 and the wall 14 of housing 10. RTV #892 adhesive is a silicone rubber sold under the trademark "Silastic" by Dow Corning. It has a specific gravity at 77° F. of 1.04; a brittle point of −100° F.; and a Durometer Hardness, Shore A Scale of 25.

In practice, particularly where military standards or specifications must be met, the dial unit is placed in a darkroom photometer setup, the lamps 18 energized by a specified voltage, and the movable disc 26 is manually rotated by finger or tab 30 to the angular or cross axes position which produces the desired brightness. The finger or tab 30 and disc 26 are then set or locked in this angular position by the application of a dab of adhesive or cement between the tab and housing wall.

While an exemplary embodiment of the invention has been shown and described, it will be apparent that changes, alterations, and modifications may be made in the structure and arrangement of the various parts including omission of the finger, the polarizer discs then being movable relative to each other in other manners, the discs can then be locked to each other in adjusted position in various ways, without departing from the spirit of the invention, and it is intended to be limited only by the scope of the appended claim.

What is claimed is:

1. In an indicating instrument or the like comprising a hollow open-faced casing providing a lamp chamber, lamp means positioned within said chamber, and an opaque dial member positioned at the open end of said chamber, said dial member being provided with light transmitting indicia, the combination including at least a pair of linear polarized discs positioned within said chamber between said lamp means and said dial member, at least one of said polarized discs being mounted for rotation about its transverse axis, means for rotating at least one of said discs about its transverse axis thereby to vary the angle between the polarization axes of the discs to vary the intensity of light transmitted to said indicia, pointer means positioned on the side of said polarizing means opposite said lamp means and illuminated at a fixed intensity by said lamp means whereby the brightness ratio between said dial indicia and said pointer is varied by rotation of said polarized disc, and means for locking said polarized discs in an angularly adjusted relationship with respect to each other thereby to maintain a desired intensity of light to said indicia.

References Cited

UNITED STATES PATENTS

| 2,482,410 | 9/1949 | Gaetgens | 350—111 |
| 3,005,439 | 10/1961 | Ellenwood et al. | 116—136.5 |
| 2,262,920 | 11/1941 | Carbonara | 240—9.5 X |
| 2,263,684 | 11/1941 | Ryan | 240—9.5 |
| 2,454,280 | 11/1948 | Hardesty | 240—9.5 X |
| 2,473,857 | 6/1949 | Burchell | 240—9.5 X |
| 2,506,134 | 5/1950 | Burchell | 240—9.5 X |

S. CLEMENT SWISHER, Primary Examiner

D. M. YASICH, Assistant Examiner

U.S. Cl. X.R.

240—9.5; 350—111